United States Patent [19]
Dreyfus

[11] 3,941,484
[45] Mar. 2, 1976

[54] NON-CONTACT DIMENSIONAL MEASUREMENT TECHNIQUE

[75] Inventor: Marc G. Dreyfus, Stamford, Conn.

[73] Assignee: BAI Corporation, Stamford, Conn.

[22] Filed: Oct. 31, 1974

[21] Appl. No.: 519,766

[52] U.S. Cl. ............... 356/156; 250/560; 356/157; 356/167
[51] Int. Cl.² ............... G01B 11/02; G01B 9/02
[58] Field of Search .......... 356/156, 158, 157, 167, 356/168, 159; 250/571; 178/DIG. 36

[56] References Cited
UNITED STATES PATENTS
| | | | |
|---|---|---|---|
| 3,518,007 | 6/1970 | Ito.................................. | 356/159 X |
| 3,743,428 | 7/1973 | Brown............................ | 356/167 X |
| 3,854,822 | 12/1974 | Altman et al................... | 356/168 X |

FOREIGN PATENTS OR APPLICATIONS
| | | | |
|---|---|---|---|
| 384,874 | 2/1965 | Switzerland........................ | 356/159 |

*Primary Examiner*—Alfred E. Smith
*Assistant Examiner*—Wm. H. Punter

[57] ABSTRACT

A high-speed technique for making accurate dimensional measurements of objects without physically touching the objects. The technique involves generating a low-divergence, collimated light beam which acts to silhouette the object to be measured to produce an image thereof that can be viewed and analyzed by a programmed electro-optical scanner in a manner yielding highly accurate dimensional information substantially independent of the location of the object relative to the viewer.

11 Claims, 7 Drawing Figures

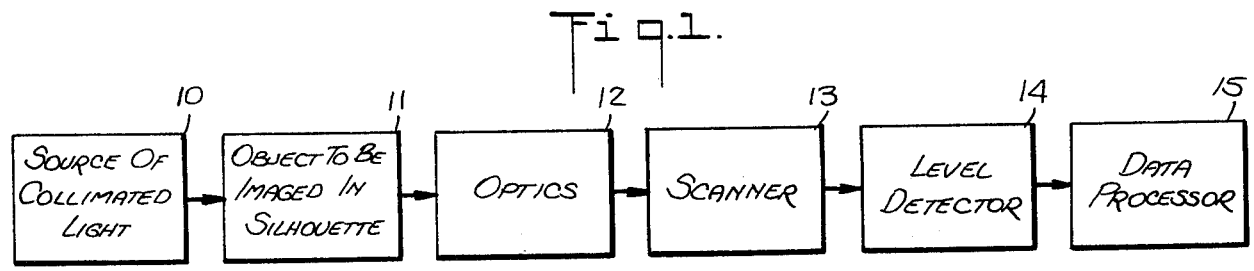
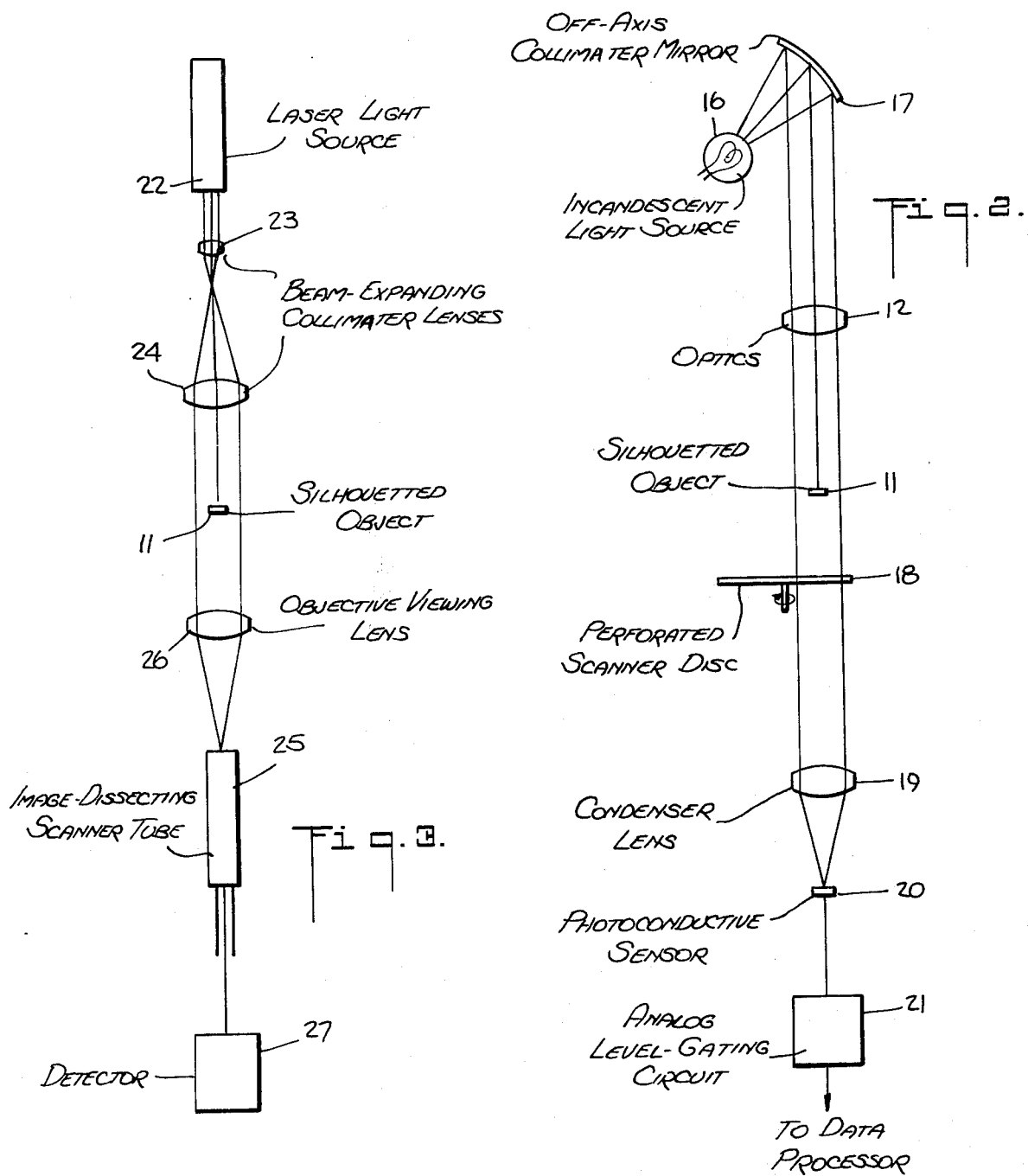

NON-CONTACT DIMENSIONAL MEASUREMENT TECHNIQUE

RELATED APPLICATION

This application is related to application Ser. No. 374,113 of Norman G. Altman and Marc G. Dreyfus, filed June 27, 1973, entitled ELECTRO-OPTICAL SCANNING SYSTEM FOR DIMENSIONAL GAUGING OF PARTS, now U.S. Pat. No. 3,854,222 and to a subsequent continuation-in-part of application thereof Ser. No. 504,289, filed Sept. 9, 1974, the disclosures of these copending applications being incorporated herein by reference.

BACKGROUND OF THE INVENTION

This invention relates to electro-optical techniques for making accurate measurements of objects at high speeds without physically touching them. It can be used, for example, to measure objects while they are moving along a factory production line at an uncertain distance with respect to a remote electro-optical measuring system, and it makes feasible object measurements at speeds and accuracies that were heretofore unattainable.

A technique in accordance with the invention involves illuminating the object with a controlled field of radiant energy and then scanning the image which results from the interaction of the object and the field by means of an electro-optical system which includes a mini-computer. The combination of a controlled field and a scanner system yields a range of performance capabilities which has significant practical advantages.

There are many examples in the prior art wherein controlled light fields are used in instruments designed for visual observation and for electro-optical measurement. Thus, microscope substage illuminators are usually designed to deliver light flux through a controlled area corresponding to the field of view, with a controlled degree of angular divergence corresponding to the numerical aperture of the viewing system.

The significance of divergence control in microscope illumination on the acuity of visual observation has been known for over 100 years. Consistent with this knowledge, modern microscope illuminators are typically designed to generate a large angular divergence of illumination in order to produce high visual resolution. In this regard reference is made to "Technical Optics" by L. C. Martin, published by Pittman & Sons Ltd., 1954 (Volume II, Chapter III, titled "The Microscope'-'—pages 80–146).

With the advent of laser technology and coherent holography, renewed interest has been aroused in the study of a controlled light field. But the purpose of this study has largely been to improve the resolving power of instruments for visual imaging under laboratory conditions, rather than to develop electro-optical instruments which yield precise object measurements at high speeds in industial environments.

Another application of controlled light fields in optical instrumentation has been the occasional use of collimated illumination in optical comparators in order to maintain the apparent size of the visual image approximately constant for small longitudinal displacements of the object under examination. This type of controlled light field, designated "telecentric illumination" has been of limited utility because it increases image blurring due to diffractive effects and thereby further compromises an already limited precision of dimensional readout due to the limitations of human visual contrast perception. In this regard, reference is made to "Applied Optics and Optical Engineering" by R. Kingslake—Academic Press—1965 (Vol. I, Section 6 III. 4, page 232, entitled "Limitations of Ray Bundles—Telecentric Systems").

There appears, however, to be no prior appreciation of the high accuracy of object measurement plus the great freedom of object motion which are attainable by using a controlled illumination field in conjunction with a properly programmed electro-optical scanner.

In the copending application Ser. No. 374,113, non-contact dimensional measurement of objects is effected by an electronic caliper technique wherein an electronic scan acts to determine the distance between opposite edges of the object in a manner analogous to that of a mechanical caliper whose jaws engage the opposite edges. In the system disclosed in this copending application, an outline or silhouette of the object is optically projected onto the sensitive face of an electro-optical scanner. A scan generator coupled to the scanner develops scan voltages to create a scan path which traverses those edges of the image of the object outline which constitute the terminal points of a dimension to be measured.

In the later filed copending application Ser. No. 504,289, which is a continuation-in-part of the earlier-filed co-pending application, use is made of a coordinatograph technique in which the scanner is directed to look only in the vicinity of the edges whose coordinates are to be determined. A difficulty experienced with the techniques disclosed in these copending applications arises in those situations where a part or object being measured is moving toward or away from the scanner, for then the image thereof changes in scale and the trace does not reflect the true dimensions of the part.

SUMMARY OF THE INVENTION

In view of the foregoing, the main object of this invention is to provide a non-contact, dimensional measuring technique wherein a collimated light beam acts to silhouette an object to be measured to produce an image thereof that can be analyzed by a programmed electro-optical scanner in a manner which yields highly accurate dimensional information.

The improved measurement accuracy gained by an electro-optical technique in accordance with the invention results from the use of a low divergence collimated light beam which makes possible a simple scanner program producing accurate measurements of mean object dimensions independent of object location relative to the viewing system.

Moreover, the use of low divergence acts to substantially reduce the effect of system noise on statistical variations in image measurements for varying object distance, thereby minimizing the standard deviation of the mean object dimension measurements.

Also an object of this invention is to provide a relatively low cost electro-optical system for accurately measuring the dimensions of manufactured parts moving on a high-speed production line, which system is efficient, reliable and inexpensive to operate.

Briefly stated, in an arrangement according to the invention the object to be measured is illuminated with collimated light and is imaged with an optical system having a large numerical aperture (that is to say, a low $f$-number). The image so generated is viewed by a scanning system adapted to measure the instantaneous brightness of the edge of the outline of the object image and thereby analyze the nature of the Fresnel diffraction zone or pattern generated by the edge in the image plane.

The invention exploits the discovery that with an infinitely small scanning aperture and no optical blurring except that due to Fresnel diffraction, the point on the image corresponding to the edge which generates the Fresnel pattern is that point whose amplitude or brightness is 25% of the brightness which would have existed in the absence of the object. In the present system, as distinguished from those disclosed in the copending applications, the edge position of the object is established not by the transition from light to dark but by a "triggering" point action which takes place at the 25% brightness point.

The effect of a finite diameter of the scanning aperture and optical blurring due to astigmatism, coma, etc., can be calculated so that the "trigger" point on the brightness waveform corresponding to the position of the edge being measured can be established analytically in the presence of these perturbations.

OUTLINE OF THE DRAWINGS

For a better understanding of the invention as well as other objects and further features thereof, reference is made to the following detailed description to be read in conjunction with the accompanying drawings wherein:

FIG. 1 is a block diagram of an electro-optical system carrying out high-speed, non-contact dimensional measurements, the system being based on a technique in accordance with the invention;

FIG. 2 illustrates schematically a first practical embodiment of an electro-optical arrangement according to the invention which makes use of a mechanical scanner;

FIG. 3 illustrates schematically a second practical embodiment of the system which employs electronic scanning;

DESCRIPTION OF THE INVENTION

General Principles

Figure 4A:
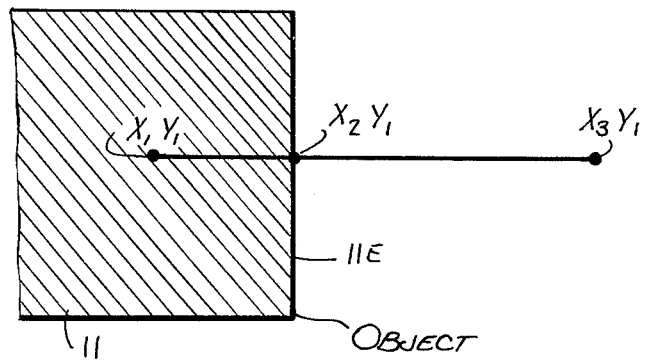
FIGS. 4A, 4B and 4C illustrate relationships between the scan and the object being examined with the video signal yielded in the output of the scanner.

Collimated light rays which silhouette an object are roughly comparable in behavior to the parallel jaws of a caliper, because the dimensions of the silhouette (neglecting diffraction and divergence effects) are constant along the light beam and independent of the location of the object. More precisely stated, we have found that the following principles apply:

Principle (A): The true dimensions of an object silhouetted by collimated light are given exactly and uniquely by the loci in the edge gradients of the silhouette image at which the photometric intensity level is 25% of the background level of the unattenuated illumination.

Principle (B): The edge blur width, designated B, in inches (measured between 10% and 90% intensity loci) of an object with distance uncertain by $\pm D$ inches, when back-illuminated by collimated light of wavelength $\lambda$, is given by the equation $B = \sqrt{\lambda D/2}$.

These principles have been established by extending classical Fresnel diffraction zone theory to include the action of an imaging optical system on a straight edge. See: Fundamentals of Optics—Jenkins and White—McGraw Hill, 2nd Ed., 1950, Section 18.10, pages 365–368, entitled "Fresnel Diffraction Straight Edge."

By means of a scanner in accordance with the invention, programmed to print out the locations of the 25% intensity level points in the image edges, one can exploit Principle (A) to carry out object measurements. In practice, this scanner has been employed to make object measurements independent of object location to an accuracy far beyond the capability of the human eye/brain structure. In a sense, the use of 25% brightness levels employs the radiant energy field in the manner of an element in a data processing system—an element which operates on input data (i.e., the object dimensions) and converts the data into an especially tractable output format.

The use of low-divergence, silhouetting illumination is important to the present technique in that it minimizes image blur due to object location uncertainty, and thereby enhances the accuracy of measurement in on-line factory applications. In order that the magnitude of this improvement may be appreciated, we shall now briefly review those factors which influence resolution in a conventional optical system.

In optical technology (see: The Principles of Optics—Hardy and Perrin—McGraw Hill—Chapter VII, pages 121-134, entitled "The Resolving Power of Optical Instruments"), it is well known that the resolution of an imaging system is inversely proportional to the diameter of its clear aperture or, otherwise stated, that resolution is inversely proportional to the numerical aperture of the transmitted flux. Also well known is that the depth of focus of an imaging system is inversely proportional to the numerical aperture of the transmitted flux cone. Consequently, one skilled in the art would be led to expect that image resolution is inversely proportional to depth of focus in a diffraction-limited optical system.

But we have discovered that this inverse relationship between resolution and depth of focus is no longer true in the special case of a silhouette image produced by low-divergence, collimated back illumination. In this case, resolution is still approximately inversely proportional to the N.A. of the viewing optics, but depth of focus is now approximately inversely proportional to the divergence of the incident illumination, with an upper boundary dictated by the width of the Fresnel diffraction blur. Hence, the depth of focus can now be enlarged substantially for a given image resolution.

This functional separation of depth of focus and resolution is due to the non-linear nature of the diffracted flux field in the vicinity of the object under examination. It is to be noted that the classic proof relating image resolution to depth of focus depends on an implicit assumption of linear flux fields and uniform distribution of illumination intensity over the collection aperture of the viewing system, whereas our new approach to non-contact, electro-optical metrology violates this implicit assumption.

It should also be noted that the use of low-divergence illumination acts to increase image blur by a factor of 1.4 as compared with the optimum diffraction-limited resolution obtained when the illumination divergence matches the acceptance numerical aperture of the viewing system. (See: "Principles of Optics"—Born and Wolf—Pergamon Press, 3rd Ed., 1964—Section 10.5.2, titled "The Influence of the Condenser on Resolution in a Microscope," pages 522–526.) But in compensation for this 40% degradation of image resolution, one can realize an increase of more than an order of magnitude in the depth of focus. Moreover, the 40% loss in acuity can readily be recovered by using a programmed scanner implementing the 25% theorem discussed previously. This greatly enlarged tolerance to object motion is of major practical value in many industrial applications.

In a technique in accordance with the invention, system resolution is basically limited by statistical fluctuations in the photometric contour of the scanned silhouette edge. These fluctuations are due to shot noise in the quantized photon count in the instantaneous image area under observation. Such noise sets a basic limit on the accuracy to which the brightness of a given spot on the edge can be measured in a short period of time. This measurement limit, however, is far beyond human visual capacity. For example, in an actual embodiment of a system according to the invention, one can measure a dimension to an accuracy finer than 50 micro-inches in a time less than 10 milliseconds.

In our new technique, the light source can be either incandescent or coherent; its divergence can be controlled by an aperture stop; collimation can be effected with lenses or mirrors; scanning can be accomplished either mechanically or electro-optically; light detection can be performed either photomissively or photoconductively; and data processing and programming can employ either analog or digital techniques. While the invention will be described with visible light as the radiant energy source, it is to be understood that the term light as used herein encompasses radiant energy in the nonvisible portions of the spectrum, such as infrared energy.

EMBODIMENTS

Referring now to FIG. 1, there is shown in block diagram form an electro-optical system in accordance with the invention adapted to carry out dimensional measurement using a collimated light to produce a silhouette of the object under examination. The system comprises a source 10 of collimated light whose rays illuminate an object 11 which is to be imaged in silhouette. Imaging is effected by an optical arrangement 12 presenting the object image in focus on the sensitive face of a scanner 13.

Scanner 13 generates a video signal which is fed into a level detector 14 adapted to determine the point in the scanning trace wherein the brightness is 25% of the average brightness of the illuminated area, the output of the detector going to a data processor 15. From the data processor, information indicative of the position in space of object 11 is derived by means of a processing technique to be later described.

The mechanical, optical and electronic arrangements by which the blocks in the system shown in FIG. 1 are reduced to practice may assume many different configurations. In one practical embodiment, as shown in FIG. 2, the requisite illumination of object 11 to be silhouetted is effected by an incandescent light source 16 whose rays are directed onto an off-axis collimating mirror 17. The collimated rays reflected from the mirror are directed by the optical element 12 toward a mechanical scanner in the form of a rotating disc 18 having appropriate apertures.

The output of scanner 18 is collected by a condenser lens 19 so that its total energy is made available to a suitable photo-conductive sensor 20. The output signal of sensor 20 is fed to the level detector 21 which may be an analog level-gating circuit whose function is the same as the level detector 14 in FIG. 1. The output of the level detector is fed to an appropriate data processor which may be a minicomputer programmed to derive the desired dimensional information and to carry out control functions such as the rejection of objects which fall outside of specified tolerances.

In the second embodiment illustrated schematically in FIG. 3, the illumination source is a laser beam generator 22 whose output rays are highly collimated in a very narrow beam. This beam is expanded by an assembly of lenses 23 and 24 to produce a beam of illumination whose width is sufficient to cover the entire area of object 11 being examined. In lieu of a mechanical scanner, use in this embodiment is made of an image dissecting scanner-tube 25. The laser rays are focused on the sensitive surface of the scanner-tube by means of an objective viewing lens 26. Suitable scanner tubes for this purpose are disclosed in the above-identified copending applications. The video output of the image dissector tube is fed into an appropriate level detector 27 for further processing.

The function of the level detector can best be understood by examining FIG. 4A which shows that the object 11 to be imaged has an edge 11E whose position in space is to be established. This edge is scanned by the techniques disclosed in the above-identified copending applications to produce a scan S. Scan S sweeps from coordinate point $X_1$, $Y_1$ to point $X_3$, $Y_1$, in a path intersecting the edge of interest at point $X_2$, $Y_1$. This scan is so generated that its position in space is a linear function of time, as shown by straight line $S_L$ in FIG. 4B, which expresses the linear relationship between the abscissa X and time.

Figure 4B:
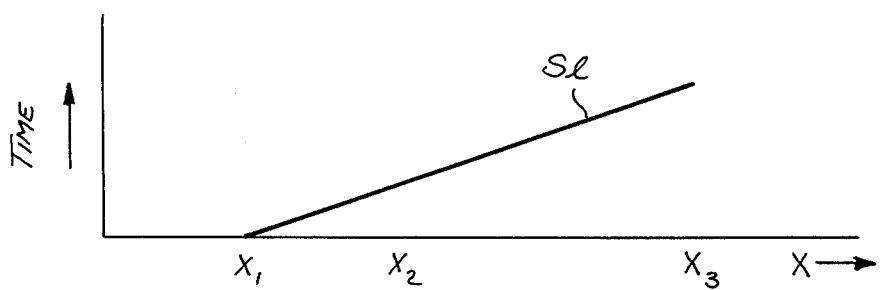
Figure 4C:
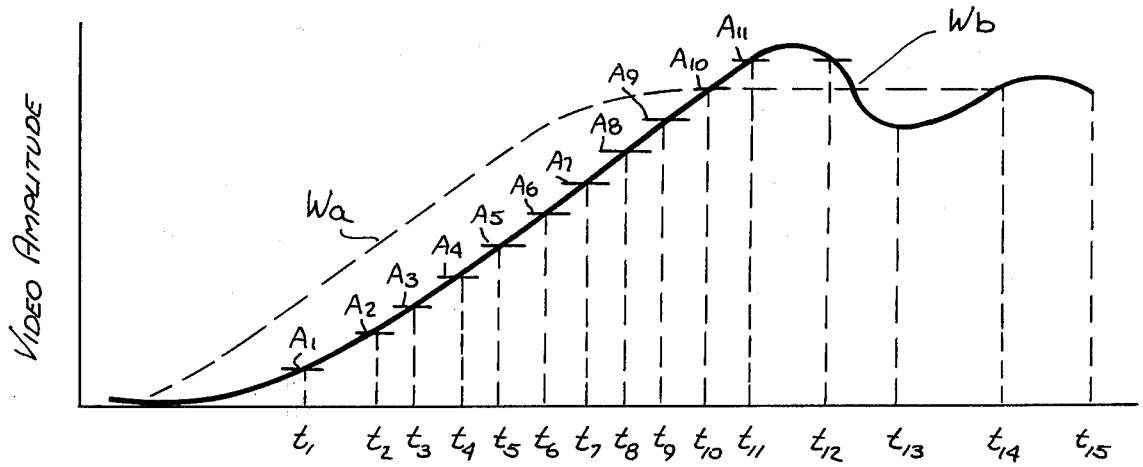

The video wave form, as shown in FIG. 4C, is on the same time base as that of line $S_L$ and can be examined as a function of video amplitude versus time. The video wave form which will be generated in the absence of diffraction effects (taking into explicit account the finite diameter of the scanning aperture) is shown as W$a$ in the plot of video amplitude versus time. However, in the presence of diffraction, the video wave form is generally of the shape shown by plot W$b$. This video wave form achieves a value well below that of plot W$a$ at the time (that is, at the position in space), corresponding to the intersection of scan line S and the edge 11E being measured.

One of the purposes of the present invention is to extract from a video wave form typified by plot W$b$ information indicative of the position of edge 11E in space, independent of the variations in distance from the system optics 12 to the object 11. Using collimated light and a large numerical aperture imaging system, as described above, the position of edge 11E is determined by establishing the time or the X position since the two are comparable, corresponding to the amplitude of the video signal representing the crossing of edge 11E by scan line S.

The technique illustrated in FIGS. 4A, 4B, and 4C is an effective way of fixing the edge position by a general purpose curve-fitting algorithm. To this end, a series of amplitude thresholds $A_1$ to $A_{11}$ are established, and the instant at which the video signal crosses each of these thresholds is then determined. The instants in time at which the video signal crosses these thresholds is shown as $t_1$, $t_2$, etc., through $t_{15}$ in FIG. 4C. The known values of the thresholds $A_1$, etc., and the developed values of the times $t_1$ through $t_{15}$ will completely identify the shape of the video amplitude curve. From this, the time and therefore the X position corresponding to the intersection of scan line S and edge 11E can readily be established.

Figure 5:
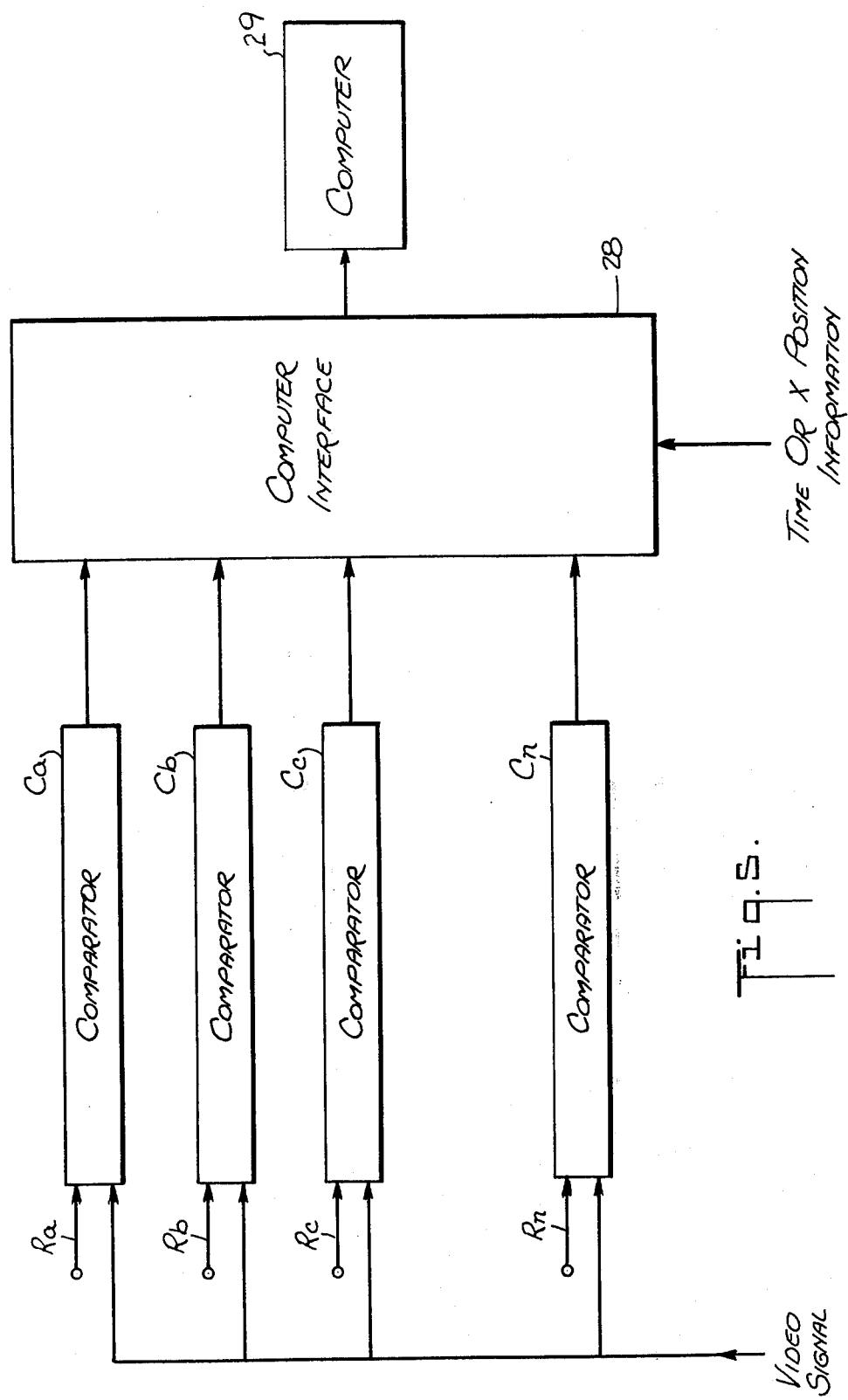
FIG. 5 is a block diagram of the data processor and the associated computer adapted to derive dimensional information from the video signal.

An arrangement for establishing the values of $t_1$ to $t_{15}$ is illustrated in FIG. 5. Here a series of electronic comparators Ca to Cn are used, each with its own set point or reference Ra to Rn corresponding to reference levels $A_1$, $A_2$, etc., shown in FIG. 4C. The video signal derived from the scanner is fed to all of these comparators in parallel relation, so that each comparator compares the video signal with a respective reference to provide an output which depends on the differences therebetween.

When the value of the video signal equals or exceeds the reference level set for a given comparator, the output of that comparator generates a signal which is fed into a computer interface 28.

Also fed into computer interface 28 is a signal indicating the time or the X position of the scan. Thus computer interface 28 generates a signal which is fed to a computer 29, the interface signal indicating the time or the X position at which the video signal crosses each of the established threshold values A1, etc. From this data, the curve of video amplitude can be re-established and the position of crossing the edge 11E of interest by the scan S can be fixed.

The algorithms for making this determination are based on an analysis fixing the ratio of the video amplitude at the position of crossing with the value of the video which would have been obtained had there been no object interposed between the illumination source and the scanner. Since in practical cases the value of the unobstructed illumination (the illumination without any object in place) does not yield a uniform video signal over the entire area of interest, it is necessary that the processing technique take into account the variations of this video when no image is present.

The general technique outlined above accomplishes this end, for the final value achieved by the video signal is a sufficiently accurate approximation of the reference video (that is, the value which would be obtained without an object) that the algorithm can be implemented by its use. If it were possible to obtain an illumination source in conjunction with an optical system and detector which produced a uniform video signal over the entire field of interest in the absence of an object, then a much simpler level detector data processor could be utilized. An available compromise (in particular when a computer with sufficient memory is available) is to map the entire field of interest to determine the value of the video signal throughout the entire field and to store this reference value in the computer. This can be done either by means of a look-up table or in the form of a polynomial in X and Y. In many cases the polynomial form is more convenient, since it normally requires much less memory space.

An alternate method of providing the necessary information of video level vs. X position can be employed, this method being based on the use of standard A – D (Analog-to-Digital) converters. In a practical system, the scan is developed by a DAC (Digital-to-Analog Converter). To achieve maximum accuracy, the DAC is operated at a relatively slow rate, i.e., at 2 microseconds per step. At this rate, the video rise time achieved by a standard scanning aperture of 0.001 inch is of the order of 150 microseconds. Thus making measurements at fifteen amplitude levels allows 10 microseconds between A – D conversions, which is readily achievable with commercially available A – D units having the requisite resolution. A reduction to practice using such A – D converters would result in the output of the A – D converter being read to the computer interface every 10 microseconds (i.e., every five steps of the DAC used to generate the scan).

It must be appreciated that the curve-fitting procedures disclosed above are extremely powerful and much more general than are realistically required in most situations. Since the fixed parameters of the system will be known a priori, it should be possible in most cases to lump their effects together in such a way that curve-fitting can be accomplished by much less than fifteen points. In the majority of practical cases, it is believed that curve-fitting can be accomplished with two or three sample points on the curve.

In summary, the present invention is based on the discovery that certain classic concepts relating to depth of field, aperture size and, f-number of resolution lack validity. All prior analyses have been predicated on an integrating-type sensor, such as the human eye or on a sensitive film where Fresnel diffraction gives rise to an edge blur that is for the most part indistinguishable from a blur caused by de-focussing. These two blurs were previously lumped together, thereby leading to the conclusion that an increase in resolution caused a decrease in the depth of field.

But when employing a scanning-type sensor in the manner of the present invention which can measure the shape of an edge, it becomes possible to separate depth of field and resolution, as now defined. This new definition of resolution is an operational one based on the capacity of a scanning system in accordance with the invention to divide a Fresnel diffraction pattern into its constituent elements. By such scanning means one can determine which of these constituent elements corresponds to the position of the image plane representing the edge of the object, thereby enlarging the operational resolution of the system well beyond that achievable by eye or film.

Thus we find that by exploiting this new operational definition of resolution, one can operate with images that have very large diffraction patterns at their edges and yet precisely determine the position on the image plane corresponding to the object of interest. One can separately control depth of field by the f-number (i.e., the divergence) of the illumination system. Using a highly-collimated illumination source, we can make the depth of field almost as great as we wish. And using a long enough period to process the information obtained by scanning the edge so illuminated, we can increase the operating resolution of the system to almost any arbitrarily desired degree.

Although the embodiments of the invention have been described in connection with a light beam which is collimated, the invention is not strictly limited to the use of collimated light. More generally one may use a beam with a small degree of convergence or divergence (i.e., a low divergence light beam) in measuring certain types of objects in order to limit the effect of certain geometric conditions, such as side wall reflection or taper angle, on the desired dimensional measurement. In these instances, the scanner program yielding object dimensions must include a correction term that depends on the interaction of flux decollimation and object motion.

As noted previously, the effect of the finite diameter of the scanning aperture and of the optical blurring due to coma and other factors can be calculated so that the "trigger" point on the brightness waveform which corresponds to the edge position can be established analytically in the presence of these perturbations. This calculation can be performed by convoluting the classic Fresnel diffraction integral with the perturbation transfer functions (such as finite diameter of scanning aperture, etc.). If these transfer functions are present to an extent significantly affecting the measurement of object dimension, then two trigger points must be used, such as 25% and 50% brightness, in order to compensate for their effects on interacting with Fresnel diffraction due to object motion toward or away from the electro-optical scanner.

While there have been shown and described preferred embodiments of an electro-optical system, it will be appreciated that many changes and modifications may be made therein without, however, departing from the essential spirit of the invention.

I claim:

1. An electro-optical technique for the non-contact gauging of an object, said technique comprising the steps of illuminating the object with a low-divergence light beam acting to silhouette the object to produce an image thereof whose outline is defined by a Fresnel diffraction.

2. A technique as set forth in claim 1, wherein said beam is collimated.

3. A technique as set forth in claim 1, wherein said signal is analyzed to determine the point in the zone whose brightness is about 25% of the brightness which would exist in the absence of the object.

4. An electro-optical system for the non-contact gauging of an object, said system comprising:

A. means to illuminate the object with a low-divergence beam acting to silhouette the object to produce an image thereof whose outline is defined by a Fresnel diffraction zone;

B. means to scan said image along a given path to produce a video signal representing the varying brightness of the zone intersected by said path;

C. level detection means to analyze said video signal representing the varying brightness of the zone intersected by the scan path to fix the point in the zone whose brightness is about 25% of the brightness which would exist in the absence of the object to produce a data signal; and D. data processing means responsive to said data signal to derive information therefrom regarding a dimension of said object.

5. A system as set forth in claim 4, wherein said beam is collimated.

6. A system as set forth in claim 5, wherein said means to illuminate said object with a collimated beam includes an incandescent light source whose rays are collected by an off-axis collimator mirror whose rays are directed toward the object.

7. A system as set forth in claim 5, wherein said means to illuminate said object with a collimated beam includes a laser source producing a narrow, collimated light beam directed toward the object and beam-expanding collimator lenses to broaden the beam to encompass the area of the object to be silhouetted.

8. A system as set forth in claim 4, wherein said scan means includes an apertured rotating disc operating in conjunction with a light-sensitive detector.

9. A system as set forth in claim 4, wherein said scan means includes an image dissecting scanner-tube.

10. A system as set forth in claim 4, wherein said means to determine the brightness of the zone includes an analog level-gating circuit.

11. A system as set forth in claim 4, wherein said means to determine the brightness of said zone includes a bank of comparators to which the video signal is applied, each comparator having a different reference level.

* * * * *

UNITED STATES PATENT OFFICE
CERTIFICATE OF CORRECTION

PATENT NO. : 3,941,484

DATED : March 2, 1976

INVENTOR(S) : Marc G. Dreyfus

It is certified that error appears in the above-identified patent and that said Letters Patent are hereby corrected as shown below:

In claim 1 after "diffraction" on line 5, the following should have been inserted:

-- zone, scanning said image along a given path to produce an electrical signal representing the varying brightness of the zone intersected by the path, and analyzing said signal to determine which point in the Fresnel diffraction zone has a brightness which is a predetermined percentage of the brightness which would exist in the absence of the object to derive information therefrom regarding a dimension of the object. --

Signed and Sealed this eighteenth Day of May 1976

[SEAL]

Attest:

RUTH C. MASON
Attesting Officer

C. MARSHALL DANN
Commissioner of Patents and Trademarks